Patented Aug. 4, 1925.

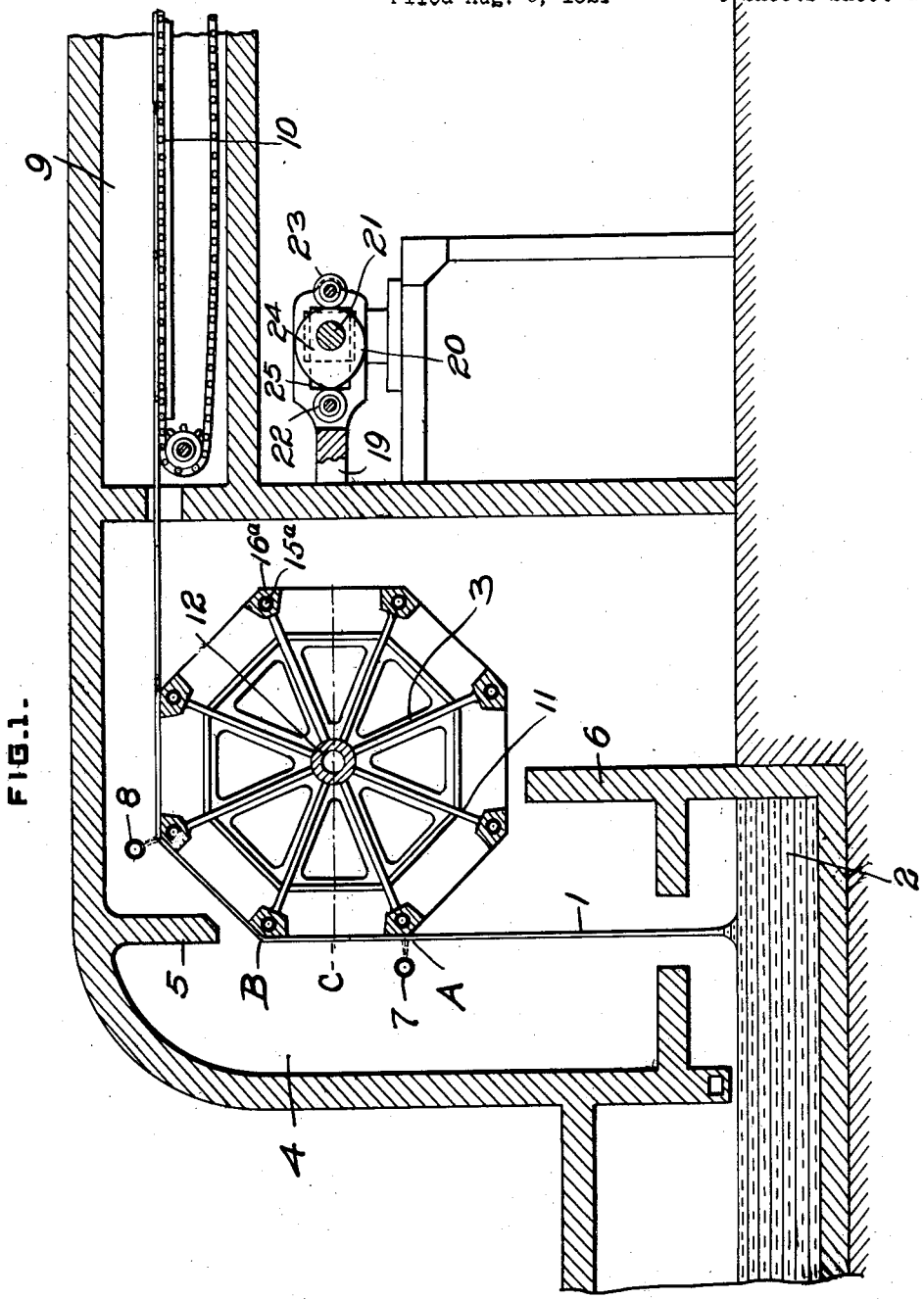

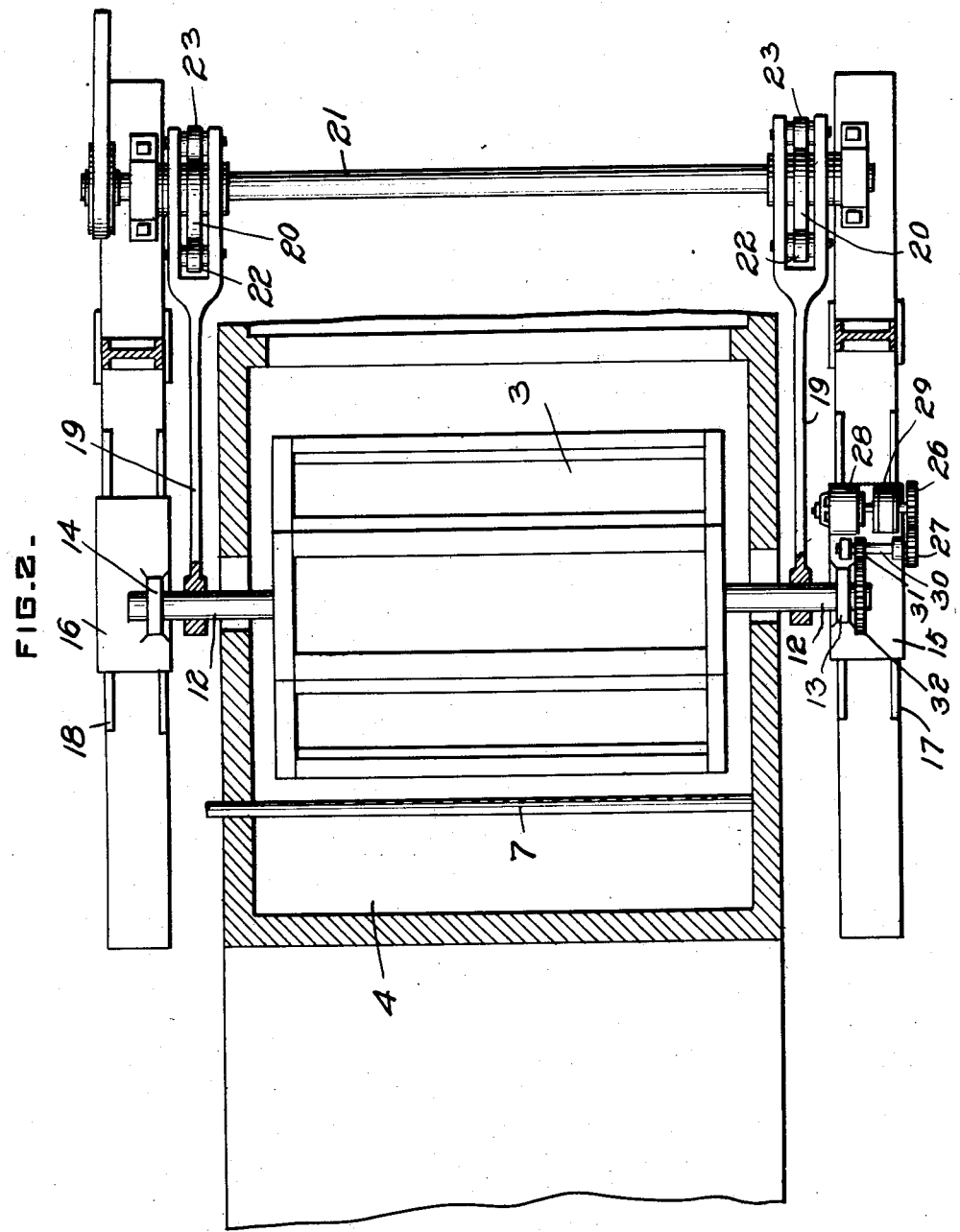

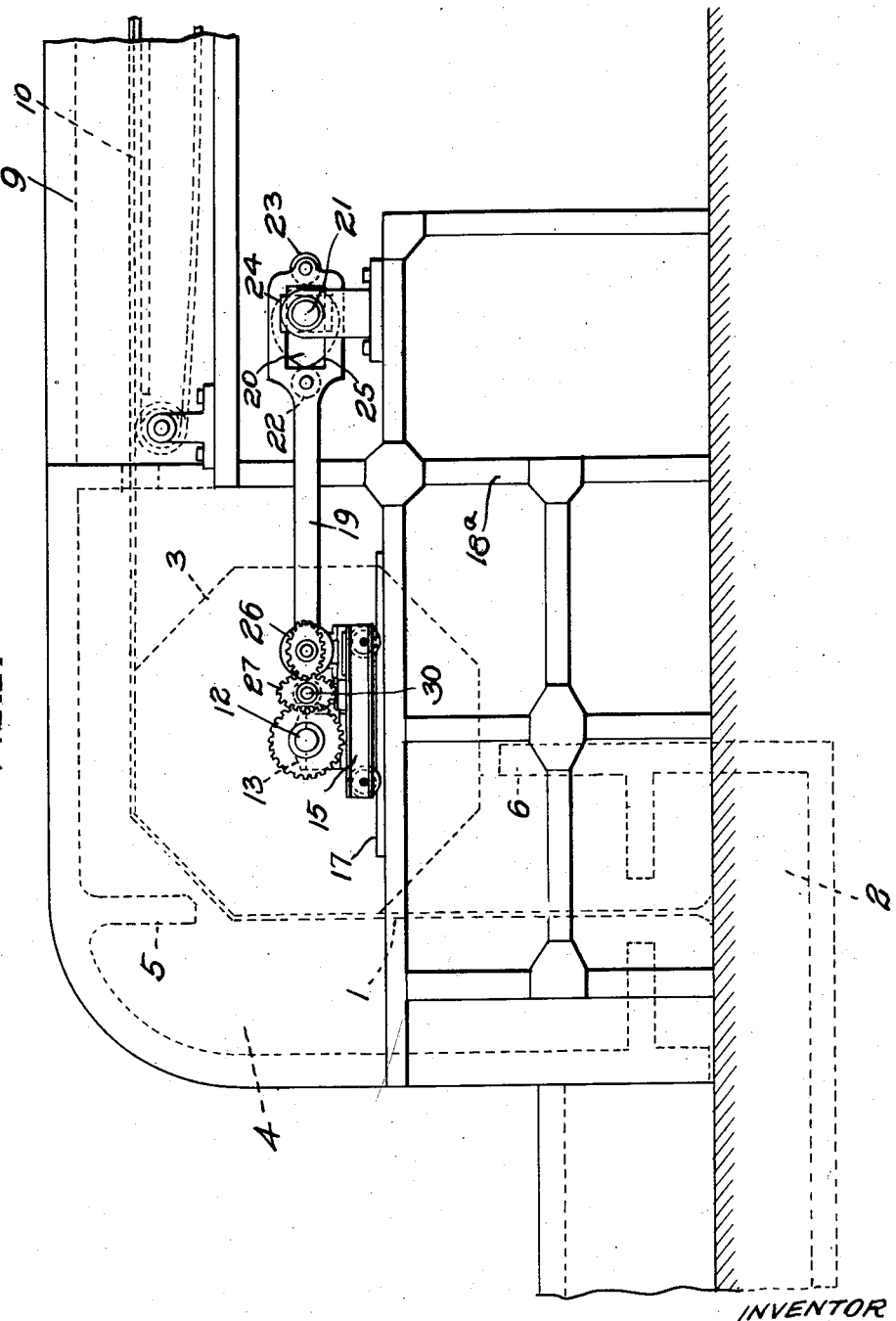

1,548,114

UNITED STATES PATENT OFFICE.

CLARENCE M. BROWN, OF PHILADELPHIA, PENNSYLVANIA, ASSIGNOR TO PITTSBURGH PLATE GLASS COMPANY, A CORPORATION OF PENNSYLVANIA.

APPARATUS FOR DRAWING GLASS.

Application filed August 9, 1921. Serial No. 490,840.

*To all whom it may concern:*

Be it known that I, CLARENCE M. BROWN, a citizen of the United States, and a resident of Philadelphia, in the county of Philadelphia and State of Pennsylvania, have made a new and useful invention in Improvements in Apparatus for Drawing Glass, of which the following is a specification.

The invention relates to an apparatus for drawing glass in sheet form, and has for its principal objects the provision of an improved apparatus for drawing a sheet vertically in a continous band, and changing its direction of movement to a plane at an angle to such vertical plane, preferably a horizontal plane, without the use of a bending roll such as has heretofore been employed. Where glass is turned over a bending roll it is a matter of great difficulty to prevent the marring of the side of the sheet in contact with the roll, as the glass must necessarily be maintained at a relatively high temperature in order to bend over the roll properly. The present invention contemplates the use of a flat sided reel instead of a roller, preferably so constructed that the sheet being drawn will contact with the reel only at the corners. Thus any contact tending to mar the glass in making the turn is reduced to a minimum. After being turned to a horizontal plane the sheet may be conducted through a leer or passageway where the glass is annealed and any flattening which may be necessary is accomplished.

The chamber in which the reel is mounted is preferably such as to maintain the glass at a bending temperature, although additional heating means may be employed, if necessary, to give the glass the required heat to bend around the corners of the reel, both as the sheet arrives at and engages and passes the reel and as it leaves such reel. In carrying out this operation, the speed of draw as provided by the corners of the reel must be made constant in order to give a uniform thickness to the glass, and the direction of draw must be maintained in the same vertical plane at all times. The apparatus is provided with suitable mechanism to secure these functions.

One embodiment of the invention in a simple, diagrammatic form is illustrated in the accompanying drawings, wherein:

Figure 1 is a vertical section through the apparatus, Fig. 2 is a plan view, and Fig. 3 is a side elevation.

The glass sheet 1 is drawn from the forehearth 2, communicating with a suitable melting chamber or furnace at the left of the apparatus. The glass is drawn over the reel 3 and into the chamber 4, which receives the main portion of its heat from the bath in the forehearth but which may be additionally heated as desired. Suitable baffle walls, such as indicated at 5 and 6, may be employed to regulate the distribution of the heat in the chamber. Suitable heating means for facilitating the bending of the glass on the reel may be employed, if necessary, such as the gas pipes 7 and 8 illustrated, provided with suitable burners. The glass as it leaves the reel may be passed into the annealing leer 9 and on to an endless carrier 10 for carrying the glass laterally through the leer.

The framework 11 of the drum is preferably made of heat resisting metal, and, if desired, may be made hollow so that a cooling fluid may be passed therethrough. The axle 12 of the leer is also made hollow for cooling purposes and extends through the side walls of the chamber 4, being mounted upon bearings 13 and 14 located adjacent the sides of the chamber as indicated in Figs. 2 and 3. The pipes or bars 15$^a$ located at the corners of the reel, are preferably surrounded by a refractory material 16$^a$, such as fire clay or other suitable compositions.

The bearings 13 and 14 which carry the ends of the shaft 12, are mounted upon the trucks 15 and 16, carried by the tracks 17 and 18, such tracks being supported upon the framework 18$^a$ surrounding the heating chamber 4. This mounting of the reel shaft provides for the back and forth movement of the reel in the heating chamber in order to maintain the line of draw of the sheet 1 always in the same vertical plane. Otherwise the corners of the reel which act as drawing elements, would alternately swing the sheet to the right and left in moving from the position marked A to the position marked B in Fig. 1. The shaft 12 and reel carried thereby must therefore be moved to the right until the corner A reaches the horizontal center line C of the drum, and must then be moved to the left during the travel from the point C to the point B. In order to secure this movement of the reel, the connecting rods 19 are employed in conjunction with the cams 20 mounted upon the drive shaft 21, the connecting rods engaging the shaft adjacent the bearings 13 and 14, as indicated in Fig. 2 and being provided at their outer ends with the rollers 22 and 23 engaging the opposite sides of the cam. The shaft 21 is mounted in guide blocks 24, which have sliding engagement in the slots 25 in the ends of the connecting rods. The cams 20 are so designed that the back and forth movement of the shaft maintains the drawing corners of the reel in a vertical plane in passing from the point A to the point B in Fig. 1.

Since the drawing corners of the drum swing upon arcs around the shaft 12 as an axis, the vertical drawing speed of these corners will not be constant with a constant speed of rotation of the axle, so that provision must be made for varying the speed of rotation of the axle in such way as to make the vertical speed of draw of the corners constant. This can be accomplished in a variety of ways, one of the simplest of which is illustrated and includes the use of the elliptical gears 26 and 27 intermediate the motor 28 and the axle 12 of the drum. The motor 28 is mounted upon the truck 15 and drives the gear 26 through the medium of suitable speed reducing mechanism placed in the gear box 29. The gear 27 is mounted upon a countershaft 30 and carries the pinion 31 meshing with the gear 32 keyed to the axle or shaft 12 of the drawing reel. The gear reduction and its relation to the drum is such that as the drawing corner of the drum moves from the point A to the horizontal plane C, the speed of rotation of the axle is decreased to give a constant vertical speed of draw to the drawing corner of the drum. From the horizontal plane C to the point B the speed of rotation of the axle is increased in order to give a constant speed of vertical movement of the drawing corner until the point B is reached, after which the cycle is repeated for each drawing corner.

What I claim is:

1. In combination in apparatus for drawing a continuous glass band or sheet, a receptacle for a glass bath, a reel over the bath provided with a plurality of corners adapted to successively engage the glass band and thus provide for the formation of relatively flat sheets between such corners as the band passes around the reel, and means for continuously drawing the band vertically over the reel and then carrying it horizontally, means being provided for maintaining the plane of draw between the bath and reel constantly in the same vertical plane, and for drawing the glass at a constant speed.

2. In combination in sheet glass drawing apparatus, a receptacle for a glass bath, a reel over the bath having a plurality of spaced drawing corners, which corners are arranged to act successively as drawing means for the glass, and means for so rotating the reel that each corner thereof during its period of draw moves at a substantially constant vertical speed.

3. In combination in sheet glass drawing appartus, a receptacle for a glass bath, a reel over the bath having a plurality of spaced drawing corners, which corners are arranged to act successively as drawing means for the glass, means for rotating the reel, and means whereby a relative horizontal movement between the axis of the reel and the bath is secured such that the portion of the sheet between the bath and the reel is always maintained in the same vertical plane.

4. In combination in sheet glass drawing apparatus, a receptacle for a glass bath, a reel over the bath having a plurality of spaced drawing corners, which corners are arranged to act successively as drawing means for the glass, means for rotating the reel so that the vertical speed of draw is maintained constant, and means whereby a relative horizontal movement between the axis of the reel and the bath is secured such that the portion of the sheet between the bath and the reel is always maintained in the same vertical plane.

5. In combination in sheet glass drawing apparatus, a receptacle for a glass bath, a reel over the bath having a plurality of spaced drawing corners, which corners are arranged to act successively as drawing means for the glass, means for rotating the reel, and means whereby the axis of the reel is moved back and forth at right angles to the plane of draw in such manner that the sheet below the reel is always maintained in the same vertical plane.

In testimony whereof, I have hereunto subscribed my name this 28th day of July, 1921.

CLARENCE M. BROWN.